US009507791B2

(12) United States Patent
Gunn

(10) Patent No.: US 9,507,791 B2
(45) Date of Patent: Nov. 29, 2016

(54) STORAGE SYSTEM USER INTERFACE WITH FLOATING FILE COLLECTION

(71) Applicant: Google Inc., Mountain View, CA (US)

(72) Inventor: Ian Gunn, Potts Point (AU)

(73) Assignee: GOOGLE INC., Mountain View, CA (US)

( * ) Notice: Subject to any disclaimer, the term of this patent is extended or adjusted under 35 U.S.C. 154(b) by 280 days.

(21) Appl. No.: 14/302,922

(22) Filed: Jun. 12, 2014

(65) Prior Publication Data

US 2015/0363062 A1 Dec. 17, 2015

(51) Int. Cl.
*G06F 3/048* (2013.01)
*G06F 17/30* (2006.01)
*G06F 3/0484* (2013.01)
*G06F 3/0485* (2013.01)
*G06F 3/0481* (2013.01)

(52) U.S. Cl.
CPC ....... *G06F 17/30126* (2013.01); *G06F 3/0484* (2013.01); *G06F 3/0481* (2013.01); *G06F 3/0485* (2013.01)

(58) Field of Classification Search
CPC .......... G06F 3/0481–3/04883; G06F 17/30067–17/30126
See application file for complete search history.

(56) References Cited

U.S. PATENT DOCUMENTS

| 5,579,471 | A | 11/1996 | Barber et al. |
| 6,006,239 | A | 12/1999 | Bhansali et al. |
| 6,009,405 | A | 12/1999 | Leyman et al. |
| 6,119,165 | A | 9/2000 | Li et al. |
| 6,314,105 | B1 | 11/2001 | Luong |
| 6,449,688 | B1 | 9/2002 | Peters et al. |
| 6,507,845 | B1 | 1/2003 | Cohen et al. |
| 6,590,568 | B1 | 7/2003 | Astala et al. |
| 6,614,804 | B1 | 9/2003 | McFadden et al. |

(Continued)

FOREIGN PATENT DOCUMENTS

| EP | 0371608 | 6/1990 |
| EP | 1275222 | 1/2003 |

(Continued)

OTHER PUBLICATIONS

Automatic Album Maker Moment.me Arrives on Android, Adds a "Manual Mode" Mode to Boost Engagement, TechCrunch, Feb. 18, 2013, http://techcrunch.com/2013/02/18/automatic-album-maker-moment-me-arrives-on-android-adds-a-manual-mode-mode-to-boost-engagement/.

(Continued)

*Primary Examiner* — Claudia Dragoescu
(74) *Attorney, Agent, or Firm* — Young Basile Hanlon & MacFarlane, P.C.

(57) ABSTRACT

A method includes outputting for display a first view representing a first plurality of objects stored in a first folder of a hierarchical storage system and receiving one or more selection inputs that designate one or more objects from the plurality of objects as selected objects. The method also includes outputting for display a floating interface element representing the selected objects and receiving a navigation input identifying a second folder of the hierarchical storage system. The method also includes executing, in response to the navigation input, a view transition that removes the first view from display and outputs, for display, a second view representing a second plurality of objects stored in the second folder, wherein the floating interface element representing the selected objects remains displayed during the view transition.

20 Claims, 7 Drawing Sheets

(56) References Cited

U.S. PATENT DOCUMENTS

| | | |
|---|---|---|
| 6,687,735 B1 | 2/2004 | Logston et al. |
| 6,711,557 B1 | 3/2004 | Palaniappan |
| 6,947,396 B1 | 9/2005 | Salmi |
| 7,030,861 B1 | 4/2006 | Westerman et al. |
| 7,113,917 B2 | 9/2006 | Jacobi et al. |
| 7,146,377 B2 | 12/2006 | Nowicki et al. |
| 7,386,576 B2 | 6/2008 | Watanabe et al. |
| 7,536,386 B2 | 5/2009 | Samji et al. |
| 7,620,902 B2 | 11/2009 | Manion et al. |
| 7,660,902 B2 | 2/2010 | Graham et al. |
| 7,711,771 B2 | 5/2010 | Kirnos |
| 7,756,821 B2 | 7/2010 | Havens et al. |
| 7,821,405 B2 | 10/2010 | Heidloff et al. |
| 7,827,299 B2 | 11/2010 | Cadarette et al. |
| 7,904,303 B2 | 3/2011 | Chien et al. |
| 7,908,183 B2 | 3/2011 | Jacobi et al. |
| 7,945,600 B1 | 5/2011 | Thomas et al. |
| 8,041,672 B2 | 10/2011 | Ogawa et al. |
| 8,132,111 B2 | 3/2012 | Baron et al. |
| 8,156,059 B2 | 4/2012 | Dunning et al. |
| 8,194,986 B2 | 6/2012 | Conwell |
| 8,196,047 B2 | 6/2012 | Fisher |
| 8,285,700 B2 | 10/2012 | Steelberg et al. |
| 8,298,087 B1 | 10/2012 | Smith |
| 8,407,613 B2 | 3/2013 | Hope |
| 8,412,731 B2 | 4/2013 | Aubert et al. |
| 8,417,000 B1 | 4/2013 | Mendis |
| 8,429,565 B2 | 4/2013 | Agarawala et al. |
| 8,458,174 B1 | 6/2013 | Duerig |
| 8,464,184 B1 | 6/2013 | Cook et al. |
| 8,467,955 B2 | 6/2013 | Jiang et al. |
| 8,468,164 B1 | 6/2013 | Paleja et al. |
| 8,479,122 B2 | 7/2013 | Hotelling et al. |
| 8,504,565 B2 | 8/2013 | Pitts |
| 8,522,230 B2 | 8/2013 | Nathan et al. |
| 8,522,258 B1 | 8/2013 | Shaw |
| 8,532,400 B1 | 9/2013 | Babenko et al. |
| 8,547,352 B2 | 10/2013 | Park et al. |
| 8,548,844 B2 | 10/2013 | Steelberg et al. |
| 8,555,173 B2 | 10/2013 | Kast |
| 8,560,975 B2 | 10/2013 | Beaver et al. |
| 8,571,331 B2 | 10/2013 | Cifarelli |
| 8,584,022 B1 | 11/2013 | O'Shaughnessy et al. |
| 8,612,439 B2 | 12/2013 | Prahlad et al. |
| 8,612,470 B1 | 12/2013 | Fushman et al. |
| 8,624,836 B1 | 1/2014 | Miller et al. |
| 8,638,312 B2 | 1/2014 | Lim |
| 8,644,688 B2 | 2/2014 | Fishman et al. |
| 8,661,053 B2 | 2/2014 | Flynn et al. |
| 8,670,597 B2 | 3/2014 | Petrou et al. |
| 2002/0054117 A1 | 5/2002 | van Dantzich et al. |
| 2002/0099844 A1 | 7/2002 | Baumann et al. |
| 2002/0112116 A1 | 8/2002 | Nelson |
| 2002/0116399 A1 | 8/2002 | Camps et al. |
| 2002/0167538 A1 | 11/2002 | Bhetanabhotla |
| 2002/0178271 A1 | 11/2002 | Graham et al. |
| 2002/0184375 A1 | 12/2002 | Wagner et al. |
| 2003/0184653 A1 | 10/2003 | Ohkubo |
| 2003/0208490 A1 | 11/2003 | Larrea et al. |
| 2004/0135904 A1 | 7/2004 | Shiota et al. |
| 2004/0189707 A1 | 9/2004 | Moore et al. |
| 2005/0033777 A1 | 2/2005 | Moraes et al. |
| 2005/0131992 A1 | 6/2005 | Goldstein et al. |
| 2005/0188174 A1* | 8/2005 | Guzak ............... G06F 17/30126 711/203 |
| 2006/0059174 A1 | 3/2006 | Mese et al. |
| 2006/0159127 A1 | 7/2006 | Childress et al. |
| 2006/0229932 A1 | 10/2006 | Zollo et al. |
| 2006/0242581 A1 | 10/2006 | Manion et al. |
| 2007/0250401 A1 | 10/2007 | Hearn et al. |
| 2008/0019610 A1* | 1/2008 | Matsuzaka ......... G06K 9/00711 382/284 |
| 2008/0123904 A1 | 5/2008 | Sakamoto et al. |
| 2008/0126476 A1 | 5/2008 | Nicholas et al. |
| 2008/0165141 A1 | 7/2008 | Christie |
| 2008/0177623 A1 | 7/2008 | Fritsch et al. |
| 2008/0195956 A1 | 8/2008 | Baron et al. |
| 2008/0270398 A1 | 10/2008 | Landau et al. |
| 2009/0112868 A1 | 4/2009 | Rajamani et al. |
| 2009/0327975 A1 | 12/2009 | Stedman |
| 2010/0017426 A1 | 1/2010 | Marston |
| 2010/0046392 A1 | 2/2010 | Childress et al. |
| 2010/0070707 A1 | 3/2010 | Nishimura |
| 2010/0161441 A1 | 6/2010 | Hounsell |
| 2010/0211575 A1 | 8/2010 | Collins et al. |
| 2010/0241971 A1 | 9/2010 | Zuber |
| 2010/0250337 A1 | 9/2010 | Kassaei |
| 2010/0251305 A1 | 9/2010 | Kimble et al. |
| 2010/0256981 A1 | 10/2010 | Nielsen et al. |
| 2010/0332846 A1 | 12/2010 | Bowden et al. |
| 2010/0332958 A1 | 12/2010 | Weinberger et al. |
| 2011/0010672 A1 | 1/2011 | Hope |
| 2011/0044512 A1 | 2/2011 | Bambha et al. |
| 2011/0208668 A1 | 8/2011 | Phillips |
| 2011/0289423 A1 | 11/2011 | Kim et al. |
| 2012/0032436 A1 | 2/2012 | Zantout et al. |
| 2012/0072449 A1 | 3/2012 | Patch et al. |
| 2012/0078845 A1 | 3/2012 | Kasbekar et al. |
| 2012/0084689 A1 | 4/2012 | Ledet et al. |
| 2012/0089610 A1 | 4/2012 | Agrawal et al. |
| 2012/0096046 A1 | 4/2012 | Kucera |
| 2012/0136936 A1 | 5/2012 | Quintuna |
| 2012/0192086 A1 | 7/2012 | Ghods et al. |
| 2012/0197980 A1 | 8/2012 | Terleski et al. |
| 2012/0213404 A1 | 8/2012 | Steiner |
| 2012/0233227 A1 | 9/2012 | Alexander et al. |
| 2012/0254332 A1 | 10/2012 | Irvin |
| 2012/0290609 A1 | 11/2012 | Britt |
| 2012/0290926 A1 | 11/2012 | Kapadia et al. |
| 2012/0290947 A1 | 11/2012 | Baggett et al. |
| 2012/0303477 A1 | 11/2012 | Ben-Itzhak |
| 2012/0303684 A1 | 11/2012 | Sakurai et al. |
| 2012/0324368 A1* | 12/2012 | Putz .................... G06F 3/0486 715/748 |
| 2013/0014023 A1 | 1/2013 | Lee et al. |
| 2013/0024464 A1 | 1/2013 | Berner et al. |
| 2013/0073976 A1 | 3/2013 | McDonald et al. |
| 2013/0080940 A1 | 3/2013 | Reeves et al. |
| 2013/0104080 A1 | 4/2013 | Bosworth et al. |
| 2013/0132896 A1 | 5/2013 | Lee et al. |
| 2013/0138674 A1 | 5/2013 | Jeong et al. |
| 2013/0138685 A1 | 5/2013 | Brucher et al. |
| 2013/0173637 A1 | 7/2013 | Kim et al. |
| 2013/0185638 A1 | 7/2013 | Tischer |
| 2013/0188886 A1 | 7/2013 | Petrou et al. |
| 2013/0202198 A1 | 8/2013 | Adam et al. |
| 2013/0263289 A1 | 10/2013 | Vijayan |
| 2013/0339435 A1 | 12/2013 | De Armas |
| 2014/0019317 A1 | 1/2014 | Casares et al. |
| 2014/0019910 A1 | 1/2014 | Kim et al. |
| 2014/0029798 A1 | 1/2014 | Flynn et al. |
| 2014/0067702 A1 | 3/2014 | Rathod |
| 2014/0068443 A1 | 3/2014 | Eng et al. |
| 2014/0164535 A1 | 6/2014 | Lynch et al. |
| 2014/0236722 A1 | 8/2014 | Rathus et al. |
| 2014/0317552 A1 | 10/2014 | Romatoski |
| 2015/0193521 A1 | 7/2015 | Schoeffler et al. |
| 2015/0363640 A1 | 12/2015 | Meyer |

FOREIGN PATENT DOCUMENTS

| | | |
|---|---|---|
| EP | 2187322 A1 | 5/2010 |
| EP | 2458512 | 5/2012 |
| WO | WO0051021 | 12/2001 |
| WO | WO03090096 | 10/2003 |
| WO | WO2007085083 | 8/2007 |
| WO | WO2009032712 | 3/2009 |
| WO | WO2012092025 | 7/2012 |

(56) References Cited

FOREIGN PATENT DOCUMENTS

OTHER PUBLICATIONS

Flayvr, A. Mobile App That Automatically Creates Photo Albums, Raises $450K Seed Round, TechCrunch, Oct. 4, 2012, http://techcrunch.com/2012/10/04/flayvr-a-mobile-app-that-automatically-creates-photo-albums-raises-450k-seed-round/.

Larson, Michael, "Probing Network Characteristics: A Distributed Network Performance Framework", Dr. Dobb's Journal, Jun. 2004, pp. 22-29.

Lowe, D., "Object recognition from local scale-invariant features," International Conference on Computer Vision Corfu, Greece (Sep. 1999) pp. 1150-1157.

ISR and Written Opinion of the International Searching Authority for International Application No. PCT/US2015010618, Mar. 25, 2015.

ISR & Written Opinion, RE: Application # PCT/US2015/020375; Jun. 12, 2015.

ISR & Written Opinion, RE: Application #PCT/US2015/020378 citing new art; Aug. 18, 2015.

\* cited by examiner

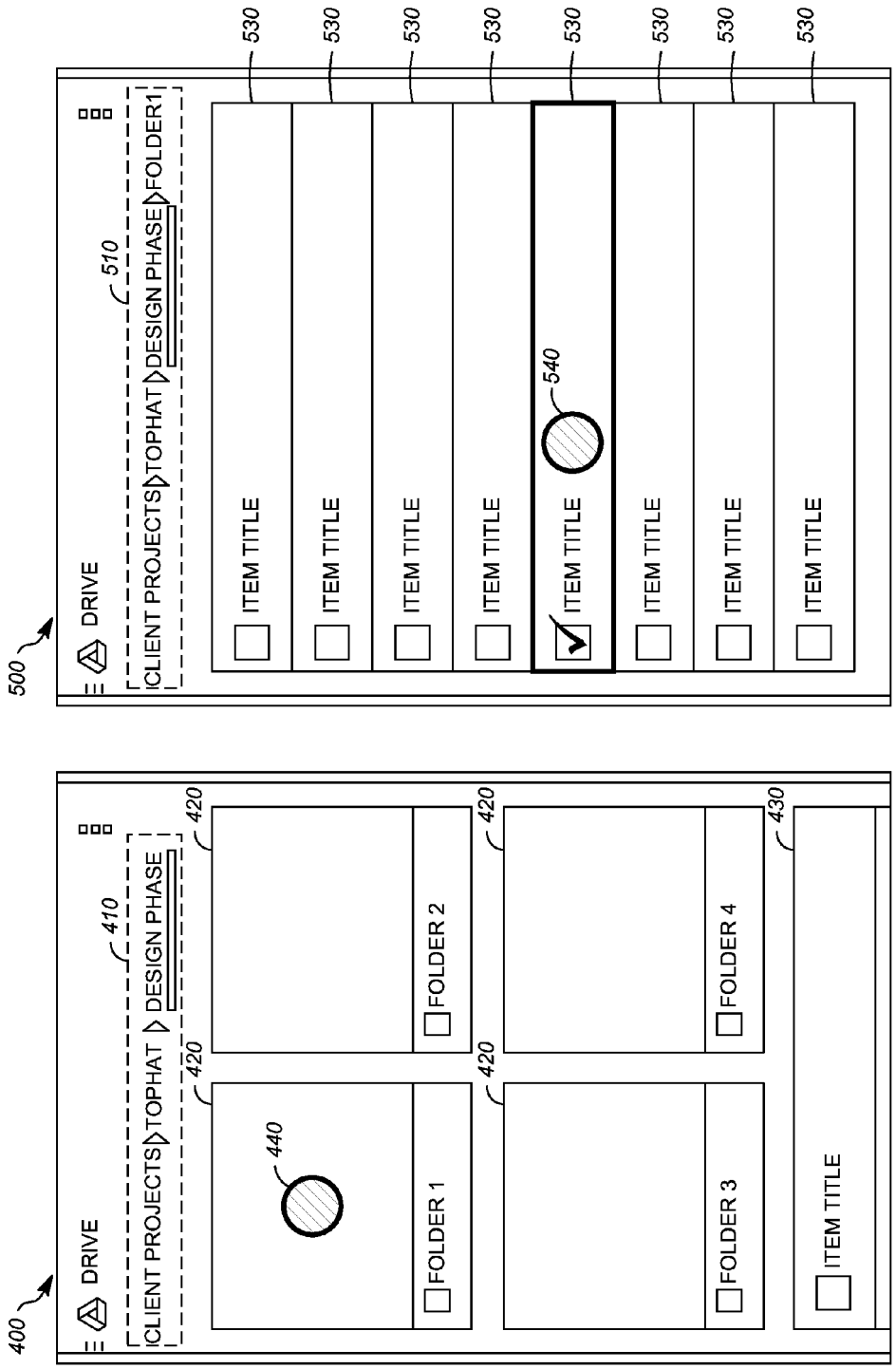

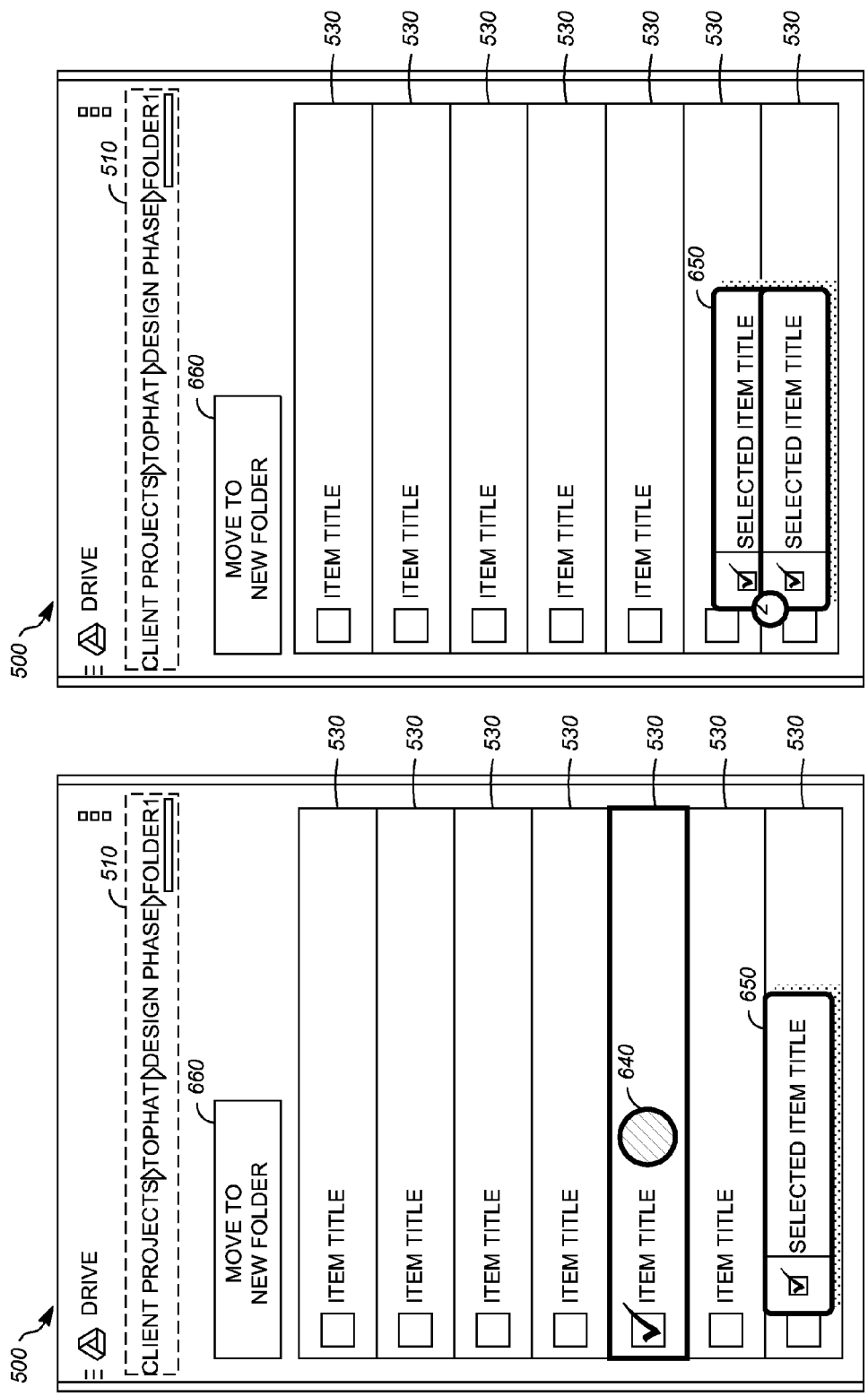

STORAGE SYSTEM USER INTERFACE WITH FLOATING FILE COLLECTION

BACKGROUND

The disclosure herein relates generally to user interfaces for computer systems that store objects.

On desktop computers, file storage systems often implement functions for moving and copying files via drag and drop operations. On devices with limited screen space, this type of interface is not readily implementable. Instead, user interfaces for storage systems for moving or copying files within a folder hierarchy often require the user to first select the files to be moved, and then enter a separate interface or dialog box in which the destination folder is selected. These interfaces are slow, require multiple interface actions by the user, and can disrupt the user's experience.

SUMMARY

The disclosure relates to a storage system user interface with a floating file collection.

One aspect of the disclosed embodiments is a method that includes outputting, by one or more processors and for display, a first view representing a first plurality of objects stored in a first folder of a hierarchical storage system and receiving, by the one or more processors, one or more selection inputs that designate one or more objects from the plurality of objects as selected objects. The method also includes outputting, by the one or more processors and for display, a floating interface element representing the selected objects and receiving, by the one or more processors, a navigation input identifying a second folder of the hierarchical storage system. The method also includes executing, by the one or more processors and in response to the navigation input, a view transition that removes the first view from display and outputs, for display, a second view representing a second plurality of objects stored in the second folder, wherein the floating interface element representing the selected objects remains displayed during the view transition.

Another aspect of the disclosed embodiments is a non-transitory computer-readable storage device including program instructions executable by one or more processors that, when executed, cause the one or more processors to perform operations. The operations include outputting, for display, a first view representing a first plurality of objects stored in a first folder of a hierarchical storage system and receiving one or more selection inputs that designate one or more objects from the plurality of objects as selected objects. The operations also include outputting, for display, a floating interface element representing the selected objects and receiving a navigation input identifying a second folder of the hierarchical storage system. The operations also include executing, in response to the navigation input, a view transition that removes the first view from display and outputs, for display, a second view representing a second plurality of objects stored in the second folder, wherein the floating interface element representing the selected objects remains displayed during the view transition.

Another aspect of the disclosed embodiments is an apparatus that includes one or more processors; and one or more memory devices for storing program instructions used by the one or more processors. The program instructions, when executed by the one or more processors, cause the one or more processors to output, for display, a first view representing a first plurality of objects stored in a first folder of a hierarchical storage system and receive one or more selection inputs that designate one or more objects from the plurality of objects as selected objects. The program instructions further cause the one or more processors to output, for display, a floating interface element representing the selected objects and receive a navigation input identifying a second folder of the hierarchical storage system. The operations further cause the one or more processors to execute, in response to the navigation input, a view transition that removes the first view from display and outputs, for display, a second view representing a second plurality of objects stored in the second folder, wherein the floating interface element representing the selected objects remains displayed during the view transition.

BRIEF DESCRIPTION OF THE DRAWINGS

The description herein makes reference to the accompanying drawings wherein like reference numerals refer to like parts throughout the several views, and wherein:

FIG. 4 is an illustration showing a first view of a parent folder interface screen;

FIG. 5 is an illustration showing a first view of a child folder interface screen;

FIG. 6 is an illustration showing a second view of the child folder interface screen;

FIG. 7 is an illustration showing a third view of the child folder interface screen;

DETAILED DESCRIPTION

According to the methods, systems, apparatuses, and computer programs that are discussed herein, file management operations can be performed in a user interface of a storage system using a floating file collection, which is also referred to as a floating interface element. The floating interface element continues to be displayed when the underlying interface is scrolled or undergoes a view transition, such as a transition from display of a first folder to display of a second folder. The floating interface element can be utilized, for example, to allow file management operations such as moving files from the first folder to a second folder.

As will be explained herein, in response to selection inputs that designate one or more objects, such as files in a folder of a hierarchical storage arrangement, a floating interface element representing the objects is output for display. The user is then able, via one or more navigation inputs, to utilize the user interface to navigate to a different location (e.g. folder) in the hierarchical storage arrangement. Navigation from one location to another is accomplished via a view transition that removes the view showing the current location and outputs for display a view showing the location specified by the navigation input, while the floating interface element representing the selected objects remains displayed during the view transition.

Figure 1:
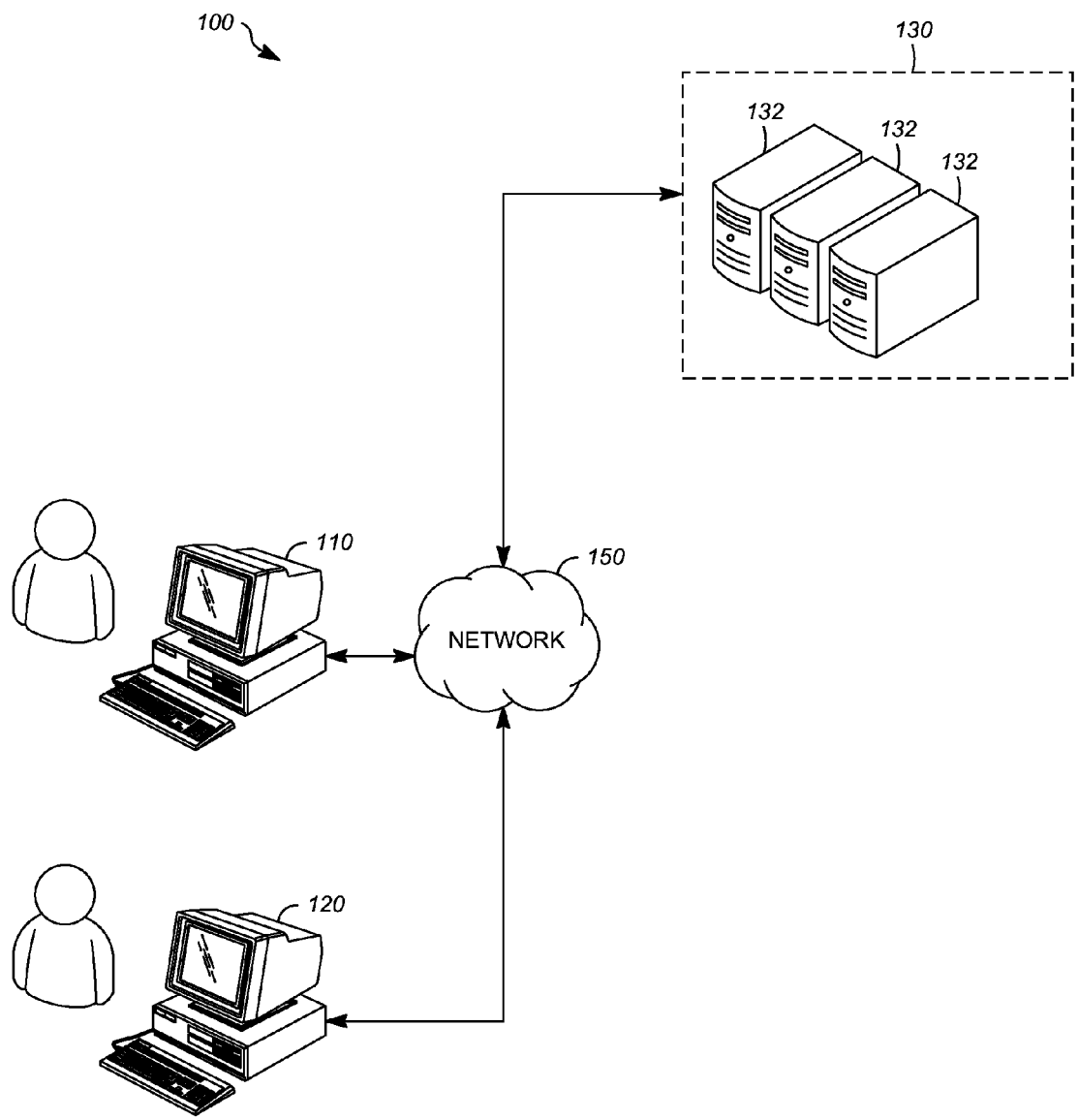
FIG. 1 is a block diagram showing an example of an environment in which a system for populating values in a spreadsheet can be implemented.

FIG. 1 shows an example of an environment 100 in which a system for populating values in a spreadsheet can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. One or more of the hosted applications can be a storage system that is operable to implement storage and retrieval functions and output, for display to a user, a user interface that allows the user to store, browse, organize, retrieve, view, delete, and/or perform other operations with respect to objects such as files. The files can be arranged by the storage system in a hierarchical manner, such as a folder structure. Herein, files are discussed as examples of objects, and the disclosure herein is equally applicable to other types of objects, such as the folders of the hierarchical folder structure. The storage system can allow access to objects by a single user or by a group of designated users. The user interface for the storage system can be output by the application hosting service 130 for display at a device associated with the user, such as the user system 110, by transmission of signals and/or data from the application hosting service to the user system 110 that, when interpreted by the user system 110, cause display of the document editing application at the user system 110.

Figure 2:
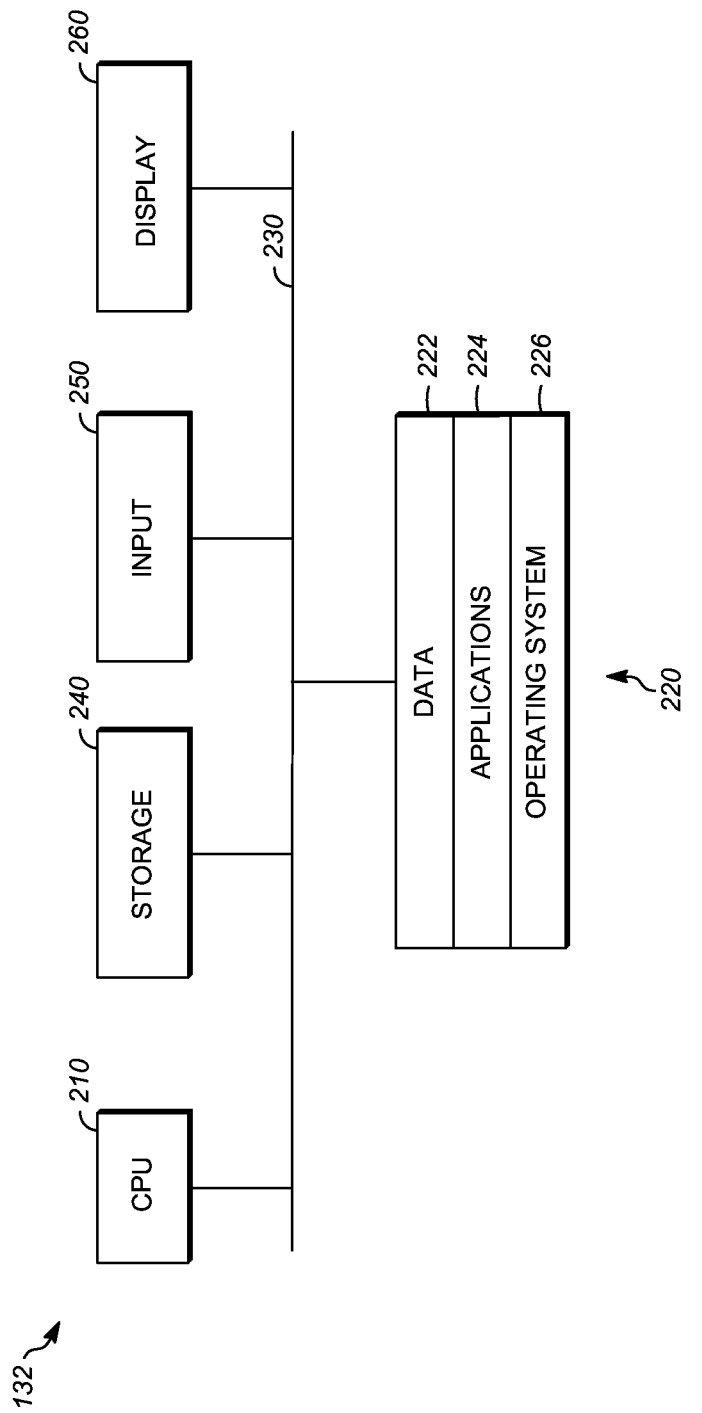
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
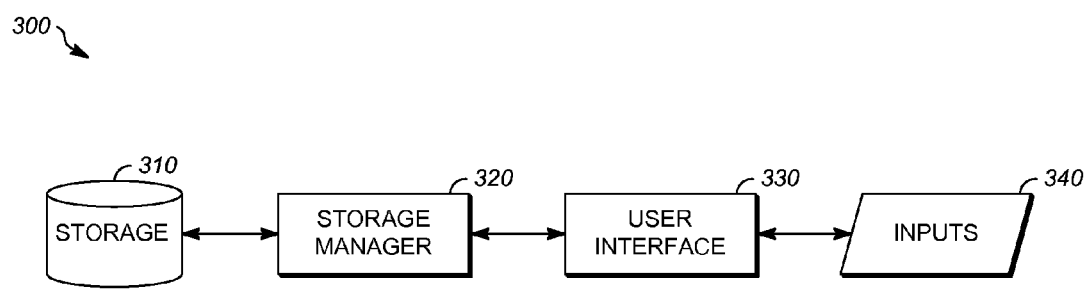
FIG. 3 is a block diagram showing a storage system.

FIG. 3 is a block diagram showing a storage system 300. The storage system 300 can be implemented in whole or part by the application hosting service 130. As one example, the application hosting service 130 can implement the storage system 300 such that information is transmitted to the user system 110 that causes user interfaces for the storage system 300 to be output for display via a web browser application at the user system 110. As another example, the user system 110 can be provided with an executable front-end application that receives information from a back end application that is executed at the application hosting service. As another example, the storage system 300 can be implemented solely at the user system 110 in the form of software executed at the user system 110.

A storage device 310 of the storage system 300 stores information including objects such as files that are stored at the storage system 300. The storage device 310 can be any device or combination of devices, including distributed storage devices. Access to the information stored at the storage device 310 is regulated by a storage manager 320, which is operable to store and retrieve objects. In some implementations the ability to store and retrieve objects is dependent upon access control information and/or user account information, which can be maintained by the storage manager 320. The storage manager 320 is operable to output information that, when processed by the user system 110, causes user interfaces 330 for the storage system 300 to be output for display. The user interfaces 330 can be, for example, views representing objects stored at the storage system, such as a view showing the objects present within a specified folder at the storage system 300, a view showing objects that match a search query, a view showing objects having a common attributes, or any other manner of view that can be used to represent objects at the storage system 300. In implementations where the storage system 300 organizes objects in a hierarchical folder-based format, the view can include information that identifies the location within the hierarchy that is currently being viewed, as well as icons, names, and/or other representations that identify the files and/or child folders that are present.

User inputs 340 can be received via user operable interface elements of the user interfaces 330 and transmitted to the storage manager 320. As used herein, a user-operable interface element is a feature incorporated in an interface that causes a program to respond to a user input. Some user-operable interface elements are associated with portions of the screen and/or visible elements of the screen, such as buttons, sliders, and selection boxes that can receive information from user inputs and/or execute actions in response to user inputs. Other user operable interface elements are not associated with portions of the screen and do not correspond to any visible element of the screen. Such interface elements can be defined be program functions that monitor user inputs and trigger actions in response to certain user inputs. As one example, a gesture input of a certain shape, direction, and/or velocity can be utilized to trigger an action without respect to the location of the gesture input with respect to the screen. As another example, a key press or combination of key presses can, when recognized by the interface, trigger an action. Other examples are well known in the field of user interfaces for computer software, and can be incorporated in the user interfaces 330.

FIG. 4 is an illustration showing a first view of a parent folder interface screen 400 of the storage system 300. The parent folder interface screen 400 displays information that corresponds to a folder in a hierarchical file storage structure that is maintained by the storage system 300. The name "parent folder interface screen" is used in the explanation made herein to distinguish between interface screens showing different folders, and is not intended to connote structure or features that are different from the features of any of the folders contained in it, or any other folder within the hierarchical file storage structure.

The parent folder interface screen 400 includes a path indicator 410. The path indicator 410 includes information that identifies the location within the hierarchical file storage structure of the storage system 300 that is represented by the parent folder interface screen 400. In the illustrated example, the path indicator 410 includes text showing the names of three folders, "Client projects", "TopHat", and "Design Phase." The folder currently being viewed is the "Design phase" folder, as indicated by placement of the name of that folder at the far right of the path indicator 410 and as indicated by a graphical indication such as underlining that is applied to text the "Design phase" within the path indicator 410.

The folder names in the path indicator 410 can be separated by graphical indicators such as are arrows that indicate that each name represents a folder that is contained within the previously named folder. Thus, for example, the "Design phase" folder is contained within the "TopHat" folder, which is contained within the "Client projects" folder. The "Client projects" folder may be contained within a root folder, or within a folder that is not represented within the path indicator 410.

The path indicator 410 can include a graphical indication as to which folder is the current folder, such as by underlining, outlining, highlighting, or shading. Portions of the path indicator 410 can be or include user-operable interface elements. For example, a tap, click, or other input directed to the folder name "Client projects" could cause navigation to the "Client projects" folder. In this context, "navigation" means that the current view would be replaced with a view that represents the "Client projects" folder.

The parent folder interface screen 400 can include icons representing folders and items that are contained within the folder that is being viewed, such as folder icons 420 and item icons 430. In the illustrated example, each of the folder icons 420 and each of the item icons 430 is a rectangular area of the parent folder interface screen 400 that is bounded by lines or shading and contains text and/or images that represent a folder or other item that is contained within the folder being viewed. In the illustrated example the parent folder interface screen 400 includes four folder icons 420, representing folders named "Folder 1", "Folder 2", "Folder 3", and "Folder 4." One item icon 430 is visible. The parent folder interface screen 400, may, however, be scrollable. Thus, the view depicted in FIG. 4 may represent only a portion of the parent folder interface screen 400, and user inputs can be operable to scroll the view such that other portions are shown. In the parent folder interface screen 400 as well as the other interface screens discussed herein, the folder icons 420 and the item icons 430 can be represented by various types of views, such as a list view or a grid view, and the interface screen 400 can include an interface button (not shown) for changing the view type.

The folder icons 420 and the item icons 430 can be responsive to user inputs, and can function as user operable interface elements as explained previously. With reference to gesture-based inputs as an example, a tap can cause selection of one of the folder icons 420 or item icons 430, double-tap made with respect to one of the folder icons 420 can cause navigation to the folder that corresponds to that folder icon 420, and a double tap made with respect to one of the item icons 430 can cause the item represented by that item icon 430 to be opened for viewing and/or editing in the current software application or in a different software application.

In the illustrated example, a user interface action in the form of a navigation input 440 is made within the boundaries of the folder icon 420 that corresponds to "Folder 1." The navigation input 440 requests a view representing the contents of "Folder 1." In response to the navigation input 440, the first view of the parent folder interface screen 400 is removed from display, and a first view of a child folder interface screen 500 is output for display, as shown in FIG. 5, where the child folder interface screen 500 is a view representing the contents of "Folder 1" as requested by the navigation input.

The child folder interface screen 500 includes a path indicator 510 and a plurality of item icons 530. The path indicator 510 is as described with respect to the path indicator 410, except that the contents of the path indicator 510 are changed to add text representing the folder now being viewed, "Folder 1," which is underlined to indicate that "Folder 1" is now the current folder. The item icons 530 are as described with respect to the item icons 430. Like the parent folder interface screen 400, the view of the child folder interface screen 500 shown in FIG. 5 may be only the portion that is currently viewable without scrolling, and other portions may be viewable upon scrolling.

In the illustrated example, a user interface action in the form of a selection input 540 is made within the boundaries of one of the item icons 530. The selection input 540 is operable to cause the selected one of the item icons 530 to be added to a floating file collection, as will be explained herein. As such, the manner in which the input is made can be selected such that it is distinct from other forms of user inputs that can be made with respect to the item icons 530 or other user-operable interface elements that are incorporated in the child folder interface screen 500. As one example, the selection input 540 can be a tap or a click. As another example, the selection input 540 can be a press-and-hold gesture. As another example a separate interface button (not shown) can be incorporated in the child folder interface screen 500, and when operated by the user, a selection mode is entered in which selection inputs such as clicks or taps then cause objects to be added to a floating file collection.

FIG. 6 shows a second view of the child folder interface screen 500. The second view of the child folder interface screen 500 includes a floating file collection 650. In FIG. 6 the floating file collection includes an icon that represents a single object, which corresponds to the item icon 530 that was selected by the selection input 540 as previously described. In the illustrated example, the previously-selected item icon 530 no longer appears among the other item icons 530 after it is selected and placed in the floating file collection 650. In an alternative implementation, the previously-selected item icon 530 can remain among the other item icons 530 after it is selected. The floating file collection 650 can incorporate a similar rectangular area including text and/or graphical elements as with the item icons 530. The floating file collection 650 can be distinguished from the item icons 530 and other portions of the child folder interface screen 500 both visually and in terms of behaviors and functions.

To visually distinguish the floating file collection 650 from the item icons 530, the size or scale of the items represented in the floating file collection 650 can be changed relative to the item icons 530. For example, each item that is represented in the floating file collection 650 can be similar in proportions and content to the item icons 530, but at a slightly reduced, such as by being scaled-down to approximately two-thirds of the size of the item icons 530. As another example, the floating file collection can be visually distinguished by a graphical effect such as a drop shadow, glow, or a thick border or a contrasting color. Other graphical features can be utilized to differentiate the floating file collection from the item icons 530 and other portions of the child folder interface screen 500.

The floating file collection 650 is also differentiable from the item icons 530 in terms of behavior. As one example, the floating file collection 650 is superimposed over the item icons 530. The floating file collection 650 can be moveable with respect to the item icons 530 to reposition the floating file collection within the interface, such as by a click-and-drag interface action using a mouse or a touch-and-drag interface action using a gesture-sensitive input device. When child folder interface screen 500 (or other interface screen on which the floating file collection 650 is displayed) is scrolled, the floating file collection 650 can remain displayed while other portions of the interface scroll with respect to it.

In addition to the floating file collection 650, the second view of the child folder interface screen 500 includes a new folder target 660. The new folder target 660 is added to the interface screen when the floating file collection 650 is present, and can be removed when the floating file collection 650 is no longer present. The new folder target 660 is a discrete area of the screen, such a bounded, shaded, or otherwise distinguishable area of the interface screen. In the illustrated example, the new folder target 660 is bounded by a rectangle and includes a text legend that identifies its function (e.g. "move to new folder"). The new folder target 660 is an area of the screen on which the floating file collection 650 can be dropped to perform a file management operation. The floating file collection can be placed on the new folder target 660 by an interface action such as a drag-and-drop input, which causes creation of a new folder, and causes the objects represented by the floating file collection to be moved to the new folder. The new folder target 660 is a dedicated area that serves no other function, and is thus free of icons or buttons within its boundary.

In the illustrated example, a user interface action in the form of a selection input 640 is made within the boundaries of one of the item icons 530. The selection input 640 is operable to cause the selected one of the item icons 530 to be added to the floating file collection 650. FIG. 7 shows a third view of the child folder interface screen 500 subsequent to the selection input 640, where the appearance of the floating file collection 650 has changed to represent a stack resembling two of the item icons, and to incorporate the numeral "2" to indicate the number of items in the collection.

In the illustrated example, a user interface action in the form of a navigation input is received by the child folder interface screen after the selection input 640 is received and the floating file collection 650 is updated. In this example, the navigation input requests return to the "Design Phase" folder, as represented by the parent folder interface screen 400. This causes a view transition to a view of the parent folder interface screen. During the view transition, the child folder interface screen 500 is removed from display and the parent folder interface screen 400 is output for display while the floating file collection 650 remains output for display.

In one implementation, the navigation input is a gesture input, such as a drag or swipe type motion made transverse (i.e. horizontally across) the child folder interface screen. This can cause an animated view transition to a different view, such as a view of the parent folder interface screen 400. The animated view transition can remove the child folder interface screen 500 (i.e. a first view) from display by translating it out of a display area (e.g. window, screen, etc.) in correspondence to the gesture input. The animated view transition can output a view of the parent folder interface screen 400 (i.e. a second view) for display by translating it into a display area in correspondence to the gesture input. Thus, the animated view transition can remove a first view from display by translating the first view out of a display area and simultaneously translating a second view into the display area, and this can be done in correspondence to a gesture input, where "correspondence to a gesture input" means motion that is similar to the motion of the gesture input. During the animated view transition, the floating file collection 650 remains output for display, with the child folder interface screen 500 and parent folder interface screen 400 moving with respect to it.

Figure 8:
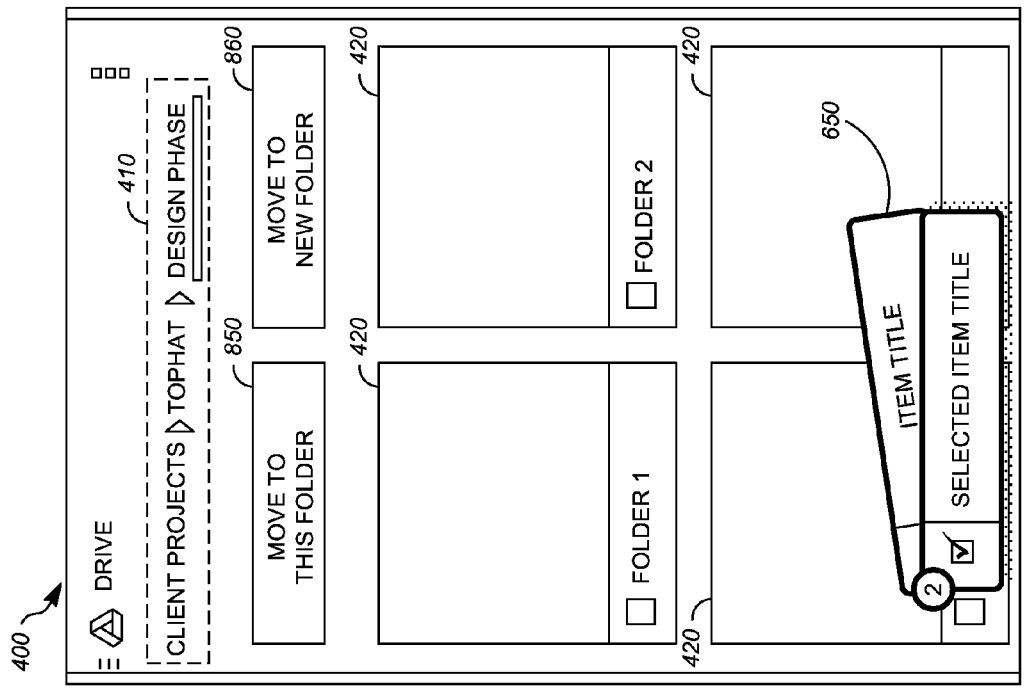
FIG. 8 is an illustration showing a second view of the parent folder interface screen.

In response to the navigation input a second view of the parent folder interface screen 400 is output for display, as shown in FIG. 8. The parent folder interface screen 400 is as described with respect to FIG. 4, but with the floating file collection 650 now superimposed over the parent folder interface screen 400, as well as addition of a move target 850 and a new folder target 860.

The move target 850 and the new folder target 860 are similar to the new folder target 660. The move target 850 allows the floating file collection 650 to be moved to the current folder if the floating file collection 650 is dropped within its boundary by a user interface action. In this example, the move target 850 is bounded by a rectangle and includes a text legend that indicates its function (e.g. "move to this folder"). This provides a dedicated and bounded area of the screen in which the floating file collection can be dropped to move it to the currently displayed folder, in contrast to typical file management interfaces that require files to be dropped among other files to move them, which can be problematic if the interface screen is crowded and there is no clear area in which to drop the file. The new folder target 860 performs the same function and operates in the same manner described with respect to the new folder target 660.

Figure 9:
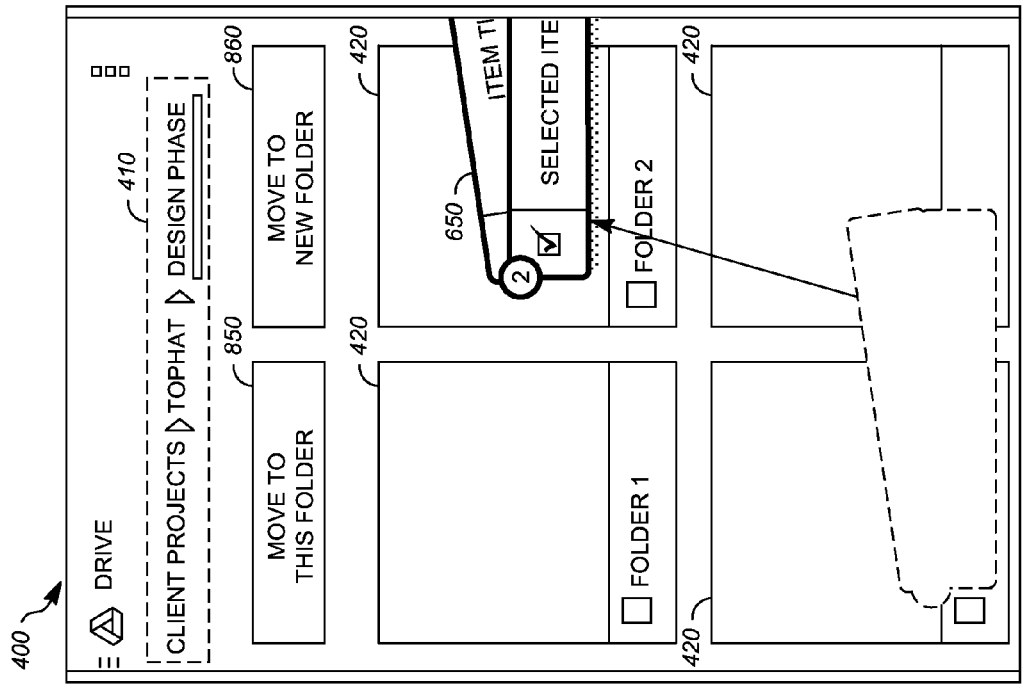
FIG. 9 is an illustration showing a third view of the parent folder interface screen.

A move input is received with respect to the floating file collection. The move input is an input signal that represents a user intention to place the objects represented by the floating file collection 650 into a specific location (e.g. folder) within the hierarchical structure of the storage system. In this example the move input is a click-and-drag or touch-and-drag type input that originates within the boundaries of the floating file collection 650, causing movement of the floating file collection 650 with respect to other portions of the parent folder interface screen 400. As shown in FIG. 9, the move input positions the floating file collection 650 over one of the folder icons 420 and, when the move input is terminated with the floating file collection 650 positioned over the folder icon 420, the storage manager 320 causes the selected objects that are represented by the floating file collection to be removed from the folder they were located in, "Folder 1" in this example, and causes the selected objects to be stored in the folder designated by the move input, "Folder 2" in this example. Moving the selected objects from one folder to another can be performed by the storage manager 320 by, for example, modifying information that associates the selected objects with a particular storage location. Persons of skill in the art will understand that the move input described above is an example, and that any of many well-known types of inputs can be utilized.

Figure 10:
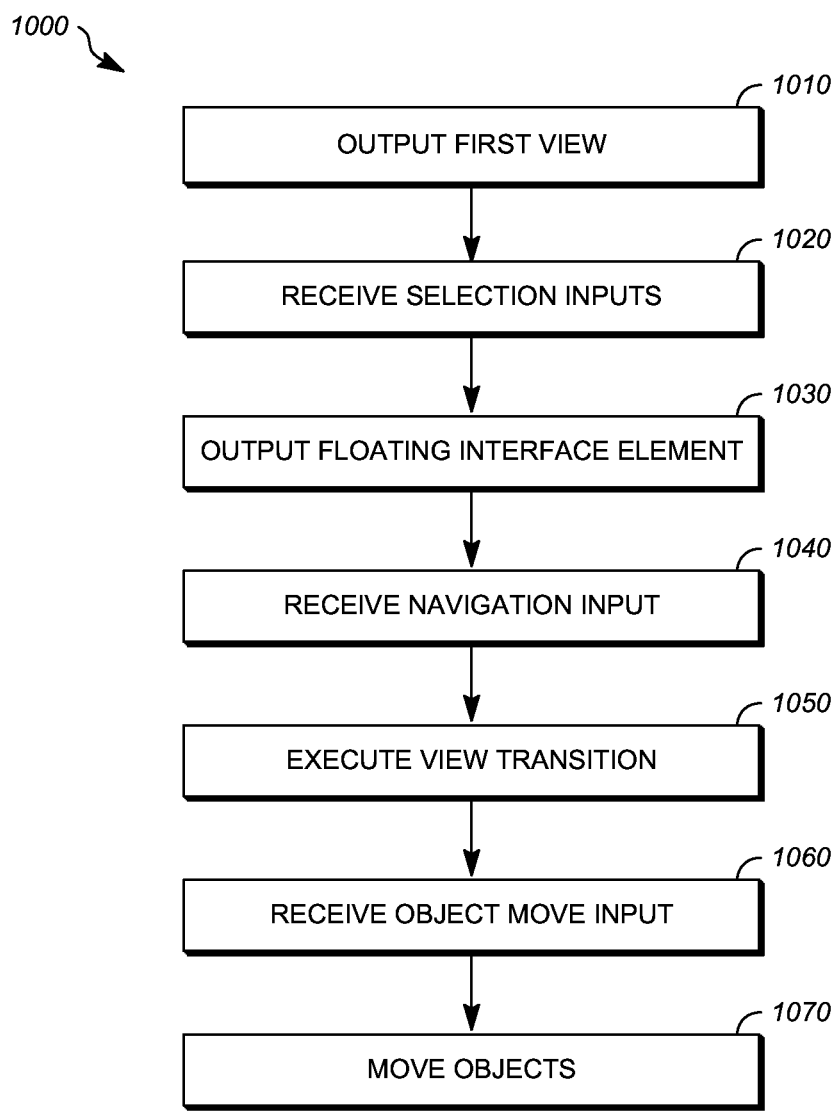
FIG. 10 is a flowchart showing a method for performing file management operations in a storage system.

FIG. 10 is a flowchart showing a first example of a process for performing file management operations in a storage system. The operations described in connection with the process 1000 can be performed at one or more computers, such as at the one or more server computers 132 of the application hosting service 130. When an operation is described as being performed by one or more computers, it is completed when it is performed by one computer working alone, or by multiple computers working together. The operations described in connection with the process 1000 can be embodied as a non-transitory computer readable storage medium including program instructions executable by one or more processors that, when executed, cause the one or more processors to perform the operations. For example, the operations described in connection with the process 1000 could be stored at the memory 220 of one of the server computers 132 and be executable by the CPU 210 thereof.

In operation 1010 a first view is output for display. The first view represents a first plurality of objects that are stored in a first location, such as a first folder, of a hierarchical file storage system, such as the storage system 300. The first view can be a scrollable view that scrolls in response to user inputs to change the portion of the first view that is currently displayed. The objects can include files and folders. One example of the first view is child folder interface screen 500 of FIG. 5.

In operation 1020, one or more selection inputs are received. The selection inputs are user input signals representing user interface actions made with respect to the first view that was output for display in operation 1010. In this context, "received" means that a signal representing the selection input becomes available to a processor or computing device for use as an input. The selection inputs designate one or more objects from the plurality of objects as selected objects. The one or more selection inputs that are received can be as described with respect to the selection input 540 and the selection input 640.

In operation 1030, a floating interface element is output for display. The floating interface element represents the selected objects. The floating interface element is output for display along with the interface displayed as the first view in operation 1010. The floating interface element can be superimposed over the first view, and can be movable in response to a positioning input. The first view can be scrollable relative to the floating interface element, such that portions of the first view are scrolled out of display (e.g. are no longer positioned in a viewable part of the interface or visible on a display screen), while the floating interface element remains displayed. The floating interface element can be as described with respect to the floating file collection 650.

In operation 1040, a navigation input is received. The navigation input can identify a second location, such as a second folder of the hierarchical storage system. In one example, the navigation input is a gesture input such as a swipe. In another example, the navigation input is a click, tap, or other input directed to a discrete interface element that represents the second location such as a portion of a path indicator, as described with respect to the path indicator 410 and the path indicator 510.

In operation 1050, a view transition is executed. The view transition is executed in response to the navigation input that was received at operation 1040. The view transition view transition that removes the first view from display and outputs, for display, a second view representing a second plurality of objects stored in the second folder. The floating interface element representing the selected objects remains displayed during the view transition. The view transition can be a non-animated view transition, such as be removing from display the objects associated with the first location and subsequently displaying the objects associated with the second location, without motion of the views or objects in them relative to the viewable area. Alternatively, the view transition can be an animated view transition from the first view to the second view, as previously described. In one implementation, an animated view transition removes the first view from display by translating the first view out of a display area in correspondence to a gesture input. In another implementation, an animated view transition outputs the second view for display by translating the second view into a display area in correspondence to a gesture input. In another implementation, an animated view transition removes the first view from display by translating the first view out of a display area and simultaneously translating the second view into the display area. In another implementation an animated view transition removes the first view from display by translating the first view out of a display area and simultaneously translating the second view into the display area in correspondence to a gesture input.

In operation 1060, an object move input is received. The object move input is a signal representing a user intention to move the selected files that are represented by the floating interface element to a location (e.g. folder) that is indicated by the object move input, as described with respect to FIG. 9.

In operation 1070, one or more objects are moved. The selected objects that are represented by the floating interface element can be moved in response to the object move input that was received at operation 1060, and to the location indicated by the object move input. The selected objects can be moved to the indicated location in the hierarchical storage system. Moving the objects can be performed as described, for example, with respect to the storage manager 320 and FIG. 9.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:
outputting, by one or more processors and for display, a first view representing a first plurality of objects stored in a first folder of a hierarchical storage system;
receiving, by the one or more processors, one or more selection inputs that designate one or more objects from the plurality of objects as selected objects;
determining, by the one or more processors, when the one or more selection inputs comprise a gesture input at a predetermined velocity in a predetermined direction;
outputting, by the one or more processors and for display, a floating interface element representing the selected objects in response to the one or more selection inputs being determined to comprise the gesture input at the predetermined velocity in the predetermined direction, wherein the floating interface element representing the selected objects is superimposed over the first view, comprises a scaled-down visual representation of the selected objects, and is movable in response to a positioning input;
receiving, by the one or more processors, a navigation input identifying a second folder of the hierarchical storage system; and
executing, by the one or more processors and in response to the navigation input, a view transition that removes the first view from display and outputs, for display, a second view representing a second plurality of objects stored in the second folder, wherein the floating interface element representing the selected objects remains displayed during the view transition.

2. The method of claim 1, wherein the first view is scrollable relative to the floating interface element.

3. The method of claim 1, wherein the navigation input comprises a gesture input of a predetermined shape.

4. The method of claim 1, wherein the view transition is an animated transition from the first view to the second view.

5. The method of claim 1, wherein the view transition removes the first view from display by translating the first view out of a display area in correspondence to a gesture input.

6. The method of claim 1, wherein the view transition outputs the second view for display by translating the second view into a display area in correspondence to a gesture input.

7. The method of claim 1, wherein the view transition removes the first view from display by translating the first view out of a display area and simultaneously translating the second view into the display area.

8. The method of claim 1, wherein the view transition removes the first view from display by translating the first view out of a display area and simultaneously translating the second view into the display area in correspondence to a gesture input.

9. The method of claim 1, further comprising:
receiving, by the one or more processors and while the second view is output for display, an object move input that causes the selected objects to be removed from the first folder and stored in the second folder.

10. A non-transitory computer-readable storage medium including program instructions executable by one or more processors that, when executed, cause the one or more processors to perform operations, the operations comprising:
outputting, for display, a first view representing a first plurality of objects stored in a first folder of a hierarchical storage system;
receiving one or more selection inputs that designate one or more objects from the plurality of objects as selected objects;
determining when the one or more selection inputs comprise a gesture input at a predetermined velocity in a predetermined direction;
outputting, for display, a floating interface element representing the selected objects in response to the one or more selection inputs being determined to comprise the gesture input at the predetermined velocity in the predetermined direction, wherein the floating interface element representing the selected objects is superimposed over the first view, comprises a scaled-down visual representation of the selected objects, and is movable in response to a positioning input;
receiving a navigation input identifying a second folder of the hierarchical storage system; and
executing, in response to the navigation input, a view transition that removes the first view from display and outputs, for display, a second view representing a second plurality of objects stored in the second folder, wherein the floating interface element representing the selected objects remains displayed during the view transition.

11. The non-transitory computer-readable storage medium of claim 10, wherein the first view is scrollable relative to the floating interface element.

12. The non-transitory computer-readable storage medium of claim 10, wherein the view transition removes the first view from display by translating the first view out of a display area and simultaneously translating the second view into the display area in correspondence to a gesture input.

13. The non-transitory computer-readable storage medium of claim 10, further comprising:
receiving, while the second view is output for display, an object move input that causes the selected objects to be removed from the first folder and stored in the second folder.

14. An apparatus, comprising:
one or more processors; and
one or more memory devices for storing program instructions used by the one or more processors, wherein the program instructions, when executed by the one or more processors, cause the one or more processors to:
output, for display, a first view representing a first plurality of objects stored in a first folder of a hierarchical storage system;
receive one or more selection inputs that designate one or more objects from the plurality of objects as selected objects;
determine when the one or more selection inputs comprise a gesture input at a predetermined velocity in a predetermined direction;
output, for display, a floating interface element representing the selected objects in response to the one or more selection inputs being determined to comprise the gesture input at the predetermined velocity in the predetermined direction, wherein the floating interface element representing the selected objects is superimposed over the first view, comprises a scaled-down visual representation of the selected objects, and is movable in response to a positioning input;
receive a navigation input identifying a second folder of the hierarchical storage system; and
execute, in response to the navigation input, a view transition that removes the first view from display and outputs, for display, a second view representing a second plurality of objects stored in the second folder, wherein the floating interface element representing the selected objects remains displayed during the view transition.

15. The apparatus of claim 14, wherein the first view is scrollable relative to the floating interface element.

16. The apparatus of claim 14, wherein the view transition removes the first view from display by translating the first view out of a display area and simultaneously translating the second view into the display area in correspondence to a gesture input.

17. The apparatus of claim 14, wherein the instructions further cause the one or more processors to:
  receive, while the second view is output for display, an object move input that causes the selected objects to be removed from the first folder and stored in the second folder.

18. The method of claim 1, further comprising:
  outputting, by the one or more processors and for display, a path indicator interface element comprising a graphical indication of the first folder or the second folder in relation to associated parent folders in the hierarchical storage system.

19. The non-transitory computer-readable storage medium of claim 10, further comprising:
  outputting, for display, a path indicator interface element comprising a graphical indication of the first folder or the second folder in relation to associated parent folders in the hierarchical storage system.

20. The apparatus of claim 14, further comprising:
  output, for display, a path indicator interface element comprising a graphical indication of the first folder or the second folder in relation to associated parent folders in the hierarchical storage system.

* * * * *